(No Model.)

W. S. SCALES.
RAISIN SEEDER.

No. 511,803. Patented Jan. 2, 1894.

WITNESSES
Charles B. Crocker.
Fred S. Pinkham.

INVENTOR
William S. Scales.
by B. J. Hayes
atty.

THE NATIONAL LITHOGRAPHING COMPANY,
WASHINGTON, D. C.

United States Patent Office.

WILLIAM S. SCALES, OF EVERETT, ASSIGNOR TO JOHN B. HUMPHREY AND JOSEPH H. CLARKE, OF SOMERVILLE, MASSACHUSETTS.

RAISIN-SEEDER.

SPECIFICATION forming part of Letters Patent No. 511,803, dated January 2, 1894.

Application filed March 18, 1893. Serial No. 466,643. (No model.)

*To all whom it may concern:*

Be it known that I, WILLIAM S. SCALES, of Everett, county of Middlesex, State of Massachusetts, have invented an Improvement in Raisin-Seeders, of which the following description, in connection with the accompanying drawings, is a specification, like letters and figures on the drawings representing like parts.

This invention has for its object to improve and simplify the construction of raisin seeding devices.

In accordance with this invention a hand piece of suitable shape to be easily grasped by the hand in such a manner as to receive the pressure upon its end, is provided at its lower end with a transverse recess, and several parallel bent yielding seed-retaining wires are secured to the lower end of said hand piece crossing said transverse recess. The transverse recess affords exits at each side for the discharge of the seeds, which may be effected by striking the implement upon a table or by shaking it in water. The space between said seed retaining wires and the bottom of the recess is sufficient for the introduction of the finger, whereby any seeds which may cling to the wires may be removed as well as any pulp which may be pressed into the recess, and more particularly whereby the device may be more easily and effectually cleansed.

Figure 1:
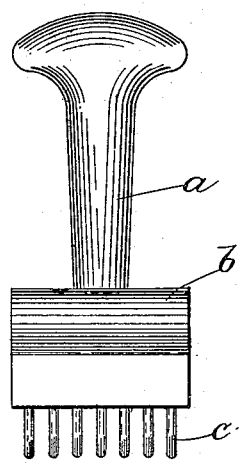
Figure 2:
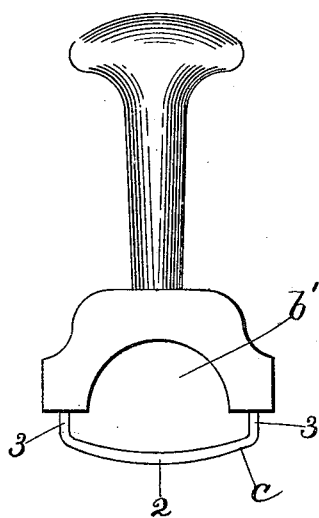

Figure 1, shows in front elevation a raisin seeding device embodying this invention; Fig. 2, a side view of the device shown in Fig. 1.

The hand piece is herein shown as composed of the handle $a$, and the block $b$, secured to its lower end. This form or construction of hand piece permits it to be readily grasped by the hand with its upper end bearing flat against the palm, so that the pressure may be applied to said upper end. The under side of the block $b$, is formed with a transverse recess $b'$, extending from side to side, and herein represented as semi-circular. Several parallel wires $c$ herein shown as seven in number are formed with curved central portions 2, and end portions or prongs 3, which are driven into the under side of the block $b$, a suitable distance to permanently secure them in position, yet permit them to yield laterally. The spaces between said wires are less than the width or thickness of the seeds, so that as the raisin laid upon a flat surface as a table for instance is compressed by said device, the seeds will pass between and be retained by said wires, after which the crushed and seeded raisin may be removed by hand. The raisins are extremely sticky, and thereby difficult to remove, but in practice it has been found that by soaking them in water the trouble is lessened, so that the crushed and seeded raisin may be removed by hand, but the seeds persistently cling to the seed retaining wires upon the inside. The transverse recess $b'$ affords exits at each side for the seeds, and by striking the device a sharp blow upon the table or by shaking it in water, most of them will be removed. The space between the curved central portions 2 of the seed retaining wires $c$ and the bottom of the recess $b'$ is sufficient however to permit the introduction of the finger, so that the seeds which still cling to the wires may be removed, and such finger receiving recess also enables the device to be more easily and effectually cleansed, which is the important and essential feature of this invention. The curved central portions 2 of the seed-retaining wires present a curved end or bearing portion upon which the device may be rocked when operated.

I claim—

The raisin seeding device herein described consisting of a hand piece adapted to be grasped by the hand with the upper end bearing against the palm, and having a transverse finger receiving recess $b'$, at its lower end, affording exits at each side, and several parallel bent yielding seed retaining wires $c$, driven into the lower end of the hand piece crossing said finger receiving recess $b'$ said wires consisting of the curved portions 2 upon which the device may rock, and the prongs 3 which enter the hand piece for a short distance substantially as described.

In testimony whereof I have signed my name to this specification in the presence of two subscribing witnesses.

WILLIAM S. SCALES.

Witnesses:
BERNICE J. NOYES,
CHARLES B. CROCKER.